United States Patent
Vidrine et al.

(10) Patent No.: US 8,601,668 B2
(45) Date of Patent: Dec. 10, 2013

(54) APPARATUS AND METHOD FOR INSERTION OF GASKETS

(75) Inventors: Andre M. Vidrine, Winter Park, FL (US); Steve Struble, New Iberia, LA (US)

(73) Assignee: Andre M. Vindrine, Winter Park, FL (US)

( * ) Notice: Subject to any disclaimer, the term of this patent is extended or adjusted under 35 U.S.C. 154(b) by 284 days.

(21) Appl. No.: 12/939,071

(22) Filed: Nov. 3, 2010

(65) Prior Publication Data

US 2011/0167607 A1    Jul. 14, 2011

Related U.S. Application Data

(60) Provisional application No. 61/295,037, filed on Jan. 14, 2010.

(51) Int. Cl.
*B23Q 3/00*    (2006.01)

(52) U.S. Cl.
USPC ................................ 29/468; 29/235; 277/609

(58) Field of Classification Search
USPC .............. 29/464, 468, 423, 525.02, 235, 280, 29/271
See application file for complete search history.

(56) References Cited

U.S. PATENT DOCUMENTS

| | | | | |
|---|---|---|---|---|
| 811,000 | A * | 1/1906 | Tompkins | 277/609 |
| 1,896,795 | A * | 2/1933 | Kendall | 277/609 |
| 3,480,301 | A * | 11/1969 | Kroening | 285/119 |
| 3,620,554 | A * | 11/1971 | Ward et al. | 285/18 |
| 3,909,011 | A * | 9/1975 | Sheesley | 277/609 |
| 4,002,344 | A * | 1/1977 | Smith | 277/609 |
| 4,495,689 | A * | 1/1985 | McNeal et al. | 29/468 |
| 4,495,690 | A * | 1/1985 | McNeal | 29/468 |
| 4,522,536 | A | 6/1985 | Vidrine | |
| 4,695,677 | A | 9/1987 | Ruth et al. | |
| 5,004,017 | A * | 4/1991 | White | 138/106 |
| 5,401,062 | A * | 3/1995 | Vowles | 285/12 |
| 5,461,904 | A * | 10/1995 | Baker | 73/46 |
| 6,260,854 | B1 * | 7/2001 | Lemon | 277/609 |
| 8,025,080 | B2 * | 9/2011 | Orleskie et al. | 138/94 |

FOREIGN PATENT DOCUMENTS

| | | |
|---|---|---|
| EP | 0767336 A2 | 4/1997 |
| GB | 685670 A | 1/1953 |
| WO | WO2007/083203 A2 | 7/2007 |

* cited by examiner

*Primary Examiner* — David Bryant
*Assistant Examiner* — Justin Sikorski
(74) *Attorney, Agent, or Firm* — Jason P. Mueller; Adams and Reese, LLP

(57) ABSTRACT

A gasket insertion apparatus and method for inserting a fluid sealing gasket between the bolted connection flanges of adjacent underwater pipe line segments is provided. The gasket insertion apparatus includes of a flat frame having an inner peripheral surface and an outer peripheral surface. The inner peripheral surface of the frame has a plurality of angularly cut teeth. The gasket is mounted within the frame and is held in place by the plurality of angularly cut teeth. The gasket insertion apparatus has a handle with an open geometric ring-shaped grip that is configured so that the gasket insertion apparatus may be gripped by a manipulation arm of an underwater remotely operated vehicle and/or by a diver. The apparatus, with gasket attached, is brought to an underwater location and inserted between adjacent flanges of a bolted flange connection by a diver or an underwater remotely operated vehicle.

33 Claims, 3 Drawing Sheets

APPARATUS AND METHOD FOR INSERTION OF GASKETS

CROSS-REFERENCE TO RELATED APPLICATIONS

This application claims the benefit of U.S. provisional application No. 61/295,037 filed Jan. 14, 2010, the contents of which are incorporated herein by reference.

FIELD

The invention relates generally an apparatus and method for insertion of gaskets and, more particularly, to an apparatus for and a method of inserting fluid sealing gaskets between the flange connectors of adjacent pipe sections of underwater pipe line sections.

BACKGROUND

In laying underwater pipelines, divers are often utilized to bolt together opposing connector flanges of adjacent pipe sections. In order to do so the divers, typically must hold these opposing connector flanges in a relatively stationary position in order to insert a fluid sealing gasket between these opposing flanges prior to completing the bolting operations that will join these opposing flanges together.

When making the bolted connections a diver must guard against having his hands caught between the relatively moving flanges of these adjacent pipe segments to avoid injury. Gasket insertion devices have been utilized to hold the sealing gaskets in a desired position between the opposing flanges in order to guard against injury to the fingers and hands of the diver and to avoid damage to the gaskets. In deep water diving situations, divers may utilize deep water diving suits or a remotely operated vehicle (a "ROV"). These devices have manipulative arms for gripping tools that aid in the joining together of these opposing flange sections. The manipulative arms of an ROV or a deep water diving suit typically limit the dexterity that may be required to properly grasp, hold and insert a sealing gasket between the opposing pipe flanges.

SUMMARY

The present invention provides an improved apparatus and method for the insertion of fluid sealing gaskets between opposing faces of flange connectors fixed to the ends of pipe sections. The improved apparatus includes a handle suitable for use with both deep water diving suits and remotely operated vehicles. The apparatus is provided with alignment tabs to aid the diver in properly aligning the gasket between the bolt holes of adjoining flanges. The handle may have a slit to accommodate the stems of leak test gaskets such as the KaMOS® RTJ Gasket manufactured by Karmsund Maritime Offshore Supply AS.

DETAILED DESCRIPTION

Figure 1:
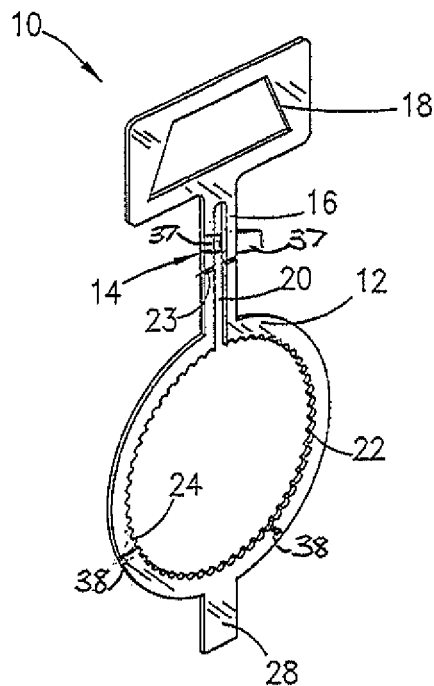
FIG. 1 is an isometric view of the gasket insertion apparatus.

Referring now to the drawings and in particular to FIG. 1, there is shown the gasket insertion apparatus 10 for inserting fluid sealing gasket between the flange connectors of adjacent pipe sections. The apparatus 10 includes a flat, ring-shaped gasket-holder frame 12 having a handle 14. The handle 14 has a shaft 16, the proximal end of which is attached to the frame 12 so that the handle shaft extends radially outward from the outer edge of the gasket-holder frame 12. The apparatus 10 may be made of any structurally suitable material such as aluminum or aluminum alloys, steel, stainless steel, mild steel, polymeric composites, or industrial laminates such as those Manufactured By Norplex-Micarta, Industrial Laminates/Norplex, Inc., 407 South 7th Street, Noblesville, Ind. 46060.

A handle grip 18 is attached to the end of shaft 16 that is distal from the frame 12 and is configured as an open trapezoidal shaped ring. The handle shaft 16 may have a split or a slit 20 that extends along the length of the handle shaft 16. The width of the slit 20 in the handle shaft 16 is sufficient to accommodate the stem of a leak test gasket such as the KaMOS® RTJ Gasket manufactured by Karmsund Maritime Offshore Supply AS. Further, the handle may be broken off at the top of the split to allow removal for use when flange faces are completely flush and the device must be removed before final bolting of the two flange halves.

The open trapezoidal ring-shaped handle grip 18 is dimensioned to accommodate a human hand, the glove or manipulator of a diving suit, or the robotic manipulators of a ROV. A variety of handle types may be utilized, the exact size and shape of the handle grip 18 will depend upon the ROV and the type of robotic manipulators provided on the ROV to grab and manipulate the grip 18. While it is thought that a handle grip configured as an open trapezoidal shaped ring will be utilized for the apparatus 10 in most instances, the handle grip 18 may be comprised of other open geometric configurations such as a triangular, circular, or rectangular ring-shaped configuration.

The interior periphery 24 of the ring-shaped frame 12 is provided with a plurality of serrations or angularly cut teeth 22. These teeth 22 serve to grab and hold in place a resilient gasket 26 positioned within the interior periphery 24 of the frame 12. The gasket 26 is positioned on the frame so that the outer diameter of the gasket 26 will fit against the interior periphery 24 of the ring-shaped frame 12.

The frame 12 may also be provided with an alignment tab 28 that also extends radially outward from the frame 12 generally opposite the handle 14. The width of the handle 14 and the alignment tab 28 may be varied according to the size of flange connectors with which the apparatus 10 is to be utilized. Ideally, the width of the tab 28 and handle 14 will be configured to span between the edges of adjacent bolt holes 34 on a pipe connection flange 30. This will allow the tab 28 or the handle 14 to serve as an aid in centering the gasket 26 as the apparatus 10 and gasket 26 are inserted between adjoining pipe flanges 30.

Figure 2:
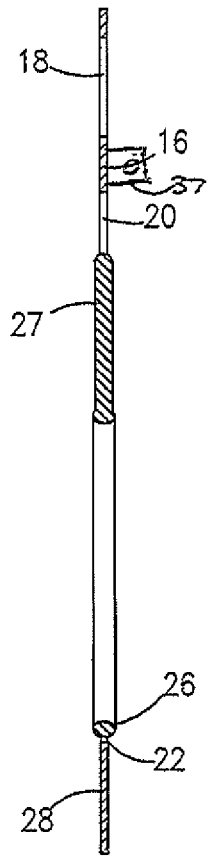
FIG. 2 is a side cross-section view of the gasket insertion apparatus of FIG. 1 and gasket combination configured for insertion between connecting flanges of a pipeline.
Figure 3:
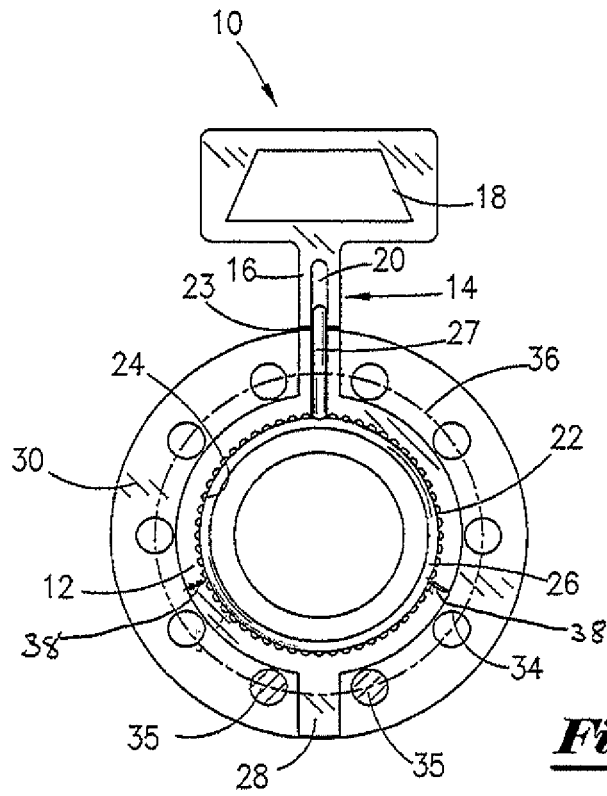
FIG. 3 is a front view of the gasket insertion apparatus of FIG. 1 and gasket combination in place between flange connectors of a pipeline.

The gasket insertion apparatus 10 and gasket 26 may be configured for use, as shown in FIGS. 2 and 3, by positioning the ring-shaped gasket 26 within the interior periphery 24 of the frame 12 so that the outer diameter of the gasket 26 is fitted against the interior periphery 24 of the ring-shaped frame 12. Fitting the resilient gasket 26 within the frame 12 in that manner will allow the teeth 22 to hold the gasket 26 in place within the interior periphery 24 of the frame 12. When the gasket 26 is a leak test gasket having a radially extending test stem 27, the gasket 26 is oriented within the frame 12 so that the extending stem 27 is positioned within the slit 20 of the handle shaft 16. Certain embodiments of the present invention may also include tabs 37, which may be configured to rest the insertion apparatus 10 on flange 30 to provide additional stability.

Figure 4:
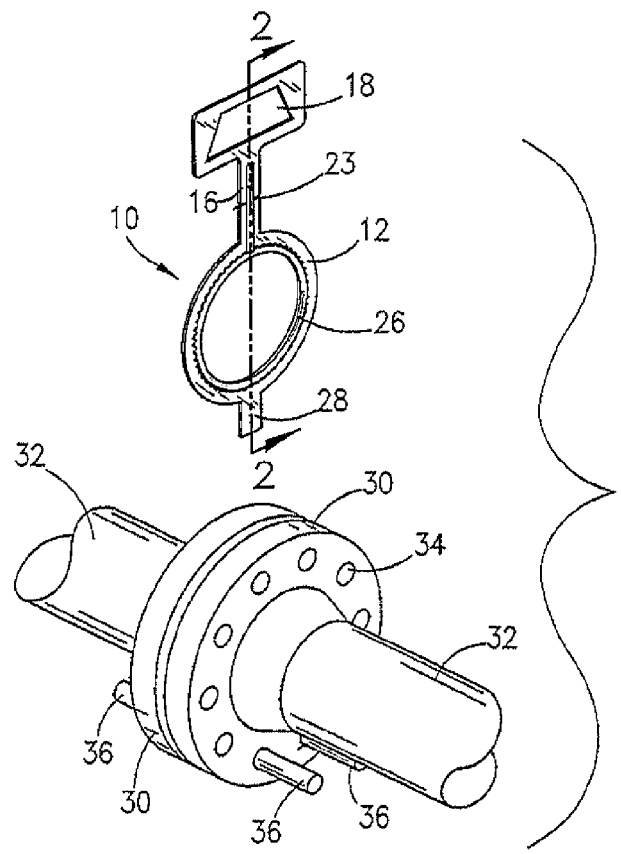
FIG. 4 is an isometric view of the gasket insertion apparatus of FIG. 1 and gasket combination configured for insertion between connecting flanges of a pipeline.
Figure 5:
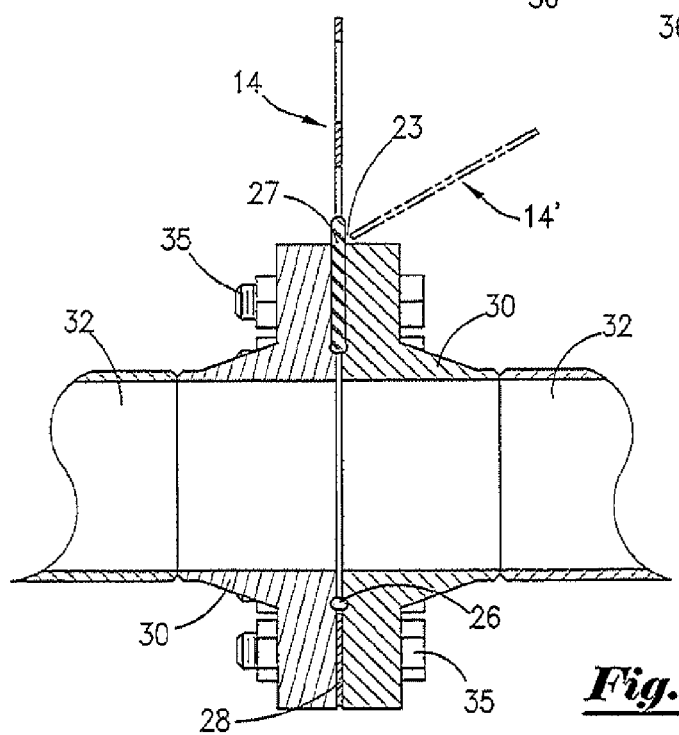
FIG. 5 is a cross-section view of the gasket insertion gasket insertion apparatus of FIG. 1 and gasket combination inserted between connecting flanges of a pipeline.

As shown in FIGS. 4 and 5, the use of the combination of the insertion apparatus 10 and a gasket 26 fitted within the frame 12 as described herein will allow a diver to effectuate the placement of the gasket 26 between the connection flanges 30 of pipeline segments 32 using only two alignment pins 35 and without having to place his hands or fingers between the flanges 30. This will allow the diver to place and position the gasket 26 in the desired location without having to connect most of the bolts that make up the connection flanges.

The apparatus 10 is used by placing a gasket 26 onto the interior periphery 24 defined by the frame 12 so that the gasket 26 is retained within the periphery 24 of the frame 12 in a push-frictional fit. The teeth 22 around the interior periphery 24 of the frame 12 serve to increase this frictional fit and hold the gasket 26 in place. A number of apparatus 10 and gasket 26 combinations may be made up as described prior to a dive and kept available for use.

When a flange to flange connection is to be made during a dive, a diver brings the connection flanges 30 of adjacent pipe segments 32 together in a desired proximity and places bolts 35 or alignment pins 36 in selected flange bolt holes 34 on the connection flanges 30. Preferably at least two alignment pins 36 are utilized and these alignment pins 36 are placed at approximately adjacent bolt holes 34 on the flanges 30.

The apparatus 10 with the inserted gasket 26 in place is then grasped by the handle grip 18 by a diver or by the gripping arms of an ROV. The apparatus 10 with the inserted gasket 26 is then placed between the adjacent connection flanges at the ends of adjacent pipe sections 32. Placement of the alignment tab 28 of the apparatus 10 between the pre-positioned alignment pins 36 will guide the alignment and placement of the gasket 26 and serve to assist the diver in centering the gasket 26 in the desired position between connection flanges 30. The alignment pins 36 serve as a stop for the frame 12 and tab 28 to facilitate vertical and horizontal centering of the frame 12 of the apparatus 10 and thus the gasket 26 between the connection flanges 30.

The handle shaft 16 may have a scored area 23 to serve as a desired break-off point for the handle 14. A diver may break the handle 14 along the scored area 23 leaving the frame 12 and the gasket 26 in position between the adjacent flanges 30. Additional scored areas 38 may also be included in frame 12 to serve as break-off points to remove frame 12 leaving the gasket 26 in position between the adjacent flanges 30.

Use of the insertion apparatus 10 in combination with a gasket 26 will allow the diver more flexibility on fixing the distance needed between the faces of the pipe flanges being connected before the gasket 26 is installed, especially when alignment pins 36 are used to position the opposing flanges adjacent to each other. The use of insertion apparatus 10 in combination with a gasket 26 and alignment pins 36 will also increase the safety of the diver as well as reduce the gasket installation time.

Figure 6:
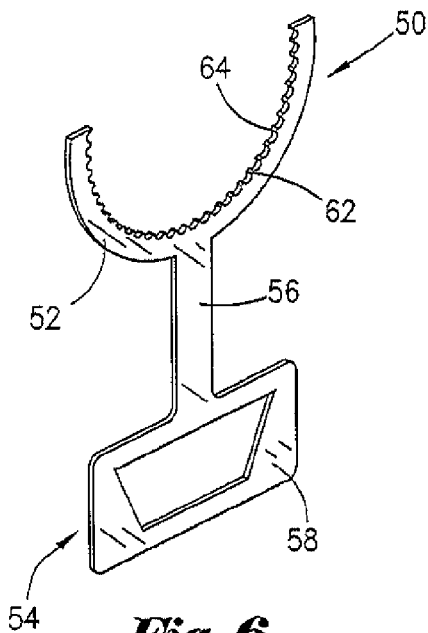
FIG. 6 is an isometric view of an alternate embodiment of the gasket insertion apparatus.

An alternate embodiment of the gasket insertion apparatus 50 is shown in FIG. 6. This embodiment may be used in the connection of adjoining pipe segments having closed face connection flanges. In this embodiment, the gasket insertion apparatus 50 is comprised of a flat U-shaped gasket-holder frame 52 having a handle 54 that extends radially outward from the outer edge of the gasket-holder frame 52. A semi-circular configuration may be most suitable for the U-shaped frame 52.

The handle 54 is further includes a handle shaft 56 and an open trapezoidal shaped handle grip 58. If a leak test gasket is to be utilized as a sealing gasket, the handle shaft 56 may have a split or slit extending along the length of the handle 56 similar to the slit 20 shown in FIG. 1 on handle 14 of apparatus 10.

The open trapezoidal shaped handle grip 58 is dimensioned to accommodate both a human hand, the glove of a diving suit, or the robotic manipulators of an ROV. The exact size and shape of the handle grip 58 will depend upon the type of robotic manipulators utilized to grab the grip 58. Other handle grip configurations, such as a triangular, circular, or rectangular configuration might also be utilized.

A plurality of serrations or angularly cut teeth 62 are provided around the interior semi-circular periphery 64 of the frame 52. These teeth 52 serve to grab and hold in place a resilient gasket 26 positioned within the interior periphery 64 of the frame 52.

Figure 7:
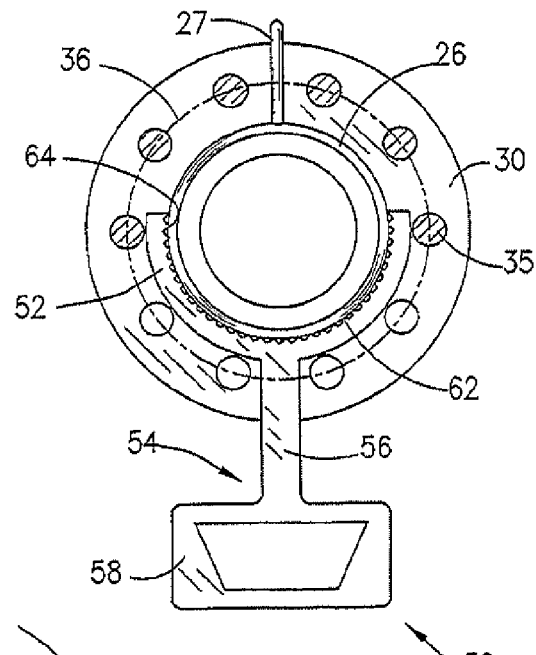
FIG. 7 is a front view of the gasket insertion apparatus of FIG. 6 and gasket combination in place between flange connectors of a pipeline.
Figure 8:
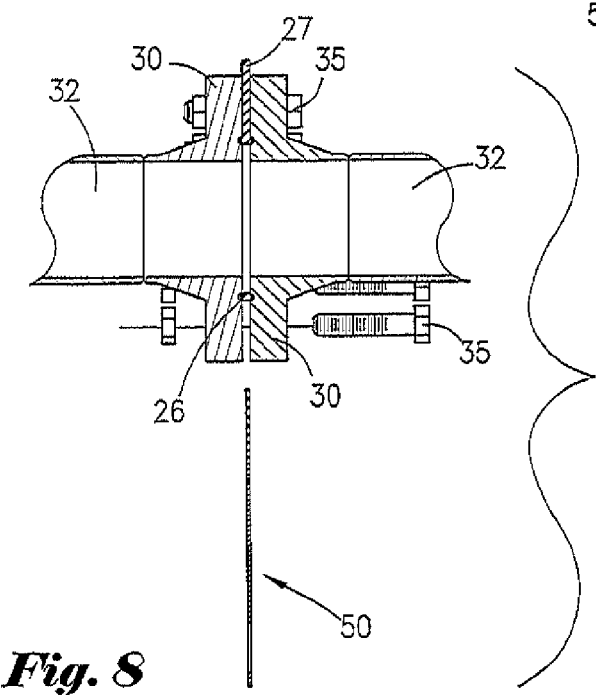
FIG. 8 is a cross-section view of the gasket insertion gasket insertion apparatus of FIG. 6 withdrawn from between the connecting flanges of a pipeline segments after a gasket has been inserted.

Typically, when closed faced connection flanges are provided for the connection of adjacent pipe segments, there is no room for a circular flange insertion apparatus 10 to fit between the connecting flanges. In such a case, as shown in FIGS. 7 and 8, the insertion apparatus 50 may be utilized.

To use the apparatus 50, a gasket 26 is frictionally mounted in place on its radial periphery by the serrations 62 that are provided around the interior semi-circular periphery 64 of the frame 52. The apparatus 50 and mounted gasket 26 is then brought to the location where the flanged connection is to be made. The closed face flanges 30 of adjacent pipe segments 32 are brought together and held in place by at least two bolts 35. The gasket 26 is then installed by pressing the insertion apparatus 50, with the gasket 26 in place, between the flanges 30 in a manner sufficient to pinch the gasket 26 and place it in a desired position between the two adjoining connection flanges. Additional connection bolts 35 may then be installed to stabilize the flange and gasket configuration. The apparatus 50 may then be removed by pulling the apparatus 50 away from the flanges 30 leaving the gasket 26 in place, and the remainder of the connection bolts 35 may then be inserted and tightened to complete the connection of the pipe segments 32.

The apparatus for and method of inserting fluid sealing gaskets between the flange connectors of adjacent pipe sections of underwater pipe lines presented herein as well as its attendant advantages will be understood from the foregoing description. It will be apparent that various changes may be made in the form, construction and arrangement of the parts thereof without departing from the spirit and scope of the invention or sacrificing all of its material advantages, the forms described herein being merely an example embodiments of the invention.

What is claimed is:

1. A gasket insertion apparatus, comprising:
   (a) a frame having an inner peripheral surface and an outer peripheral surface, said inner peripheral surface of said frame having gripping members along said inner peripheral surface of said frame;
   (b) a handle shaft extending radially outward from said outer peripheral surface of said frame, said handle shaft having a width and having a proximal end attached to said frame and a distal end extending away from said handle shaft; and
   (c) a handle grip attached to said distal end of said shaft, said handle grip configured to be gripped by a manipulation arm of an underwater remotely operated vehicle;
   wherein the handle shaft has a slit extending from the inner peripheral surface through the frame and radially within the handle shaft, terminating prior to the distal end.

2. The gasket insertion apparatus as recited in claim 1, wherein said frame is a flat ring-shaped frame.

3. The gasket insertion apparatus as recited in claim 2, further comprising a tab extending radially outward from said outer peripheral surface of said frame, said tab positioned on said ring-shaped frame opposite from said handle.

4. The gasket insertion apparatus as recited in claim 3, wherein the tab has a width so dimensioned as to be insertable between edges of adjacent bolt holes on a pipe connection flange.

5. The gasket insertion apparatus as recited in claim 4, wherein the width of said handle is dimensioned to be insertable between the edges of adjacent bolt holes on the pipe connection flange.

6. The gasket insertion apparatus as recited in claim 5, wherein said handle grip is a trapezoidal shaped ring.

7. The gasket insertion apparatus as recited in claim 2, wherein the slit is configured to accommodate a test stem of a leak test gasket.

8. The gasket insertion apparatus as recited in claim 1, wherein said handle shaft has a scored area creating a desired break-off point on said handle.

9. The gasket insertion apparatus as recited in claim 8, wherein the slit is configured to accommodate a test stem of a leak test gasket.

10. The gasket insertion apparatus as recited in claim 1, wherein said apparatus is aluminum.

11. The apparatus as recited in claim 1, wherein said frame is a flat, U-shaped frame.

12. The apparatus as recited in claim 11, wherein:
    (a) the width of said handle is so dimensioned as to be insertable between edges of adjacent bolt holes of a pipe connection flange; and
    (b) said handle grip is a trapezoidal shaped ring.

13. The apparatus as recited in claim 12, wherein the slit is configured to accommodate the test stem of a leak test gasket.

14. The apparatus as recited in claim 1, wherein the gripping members are angularly cut teeth.

15. The gasket insertion apparatus as recited in claim 2, wherein the frame has at least one scored area creating at least one break-off point on the frame.

16. A gasket insertion apparatus, comprising:
    (a) a ring-shaped frame having an inner peripheral surface and an outer peripheral surface, said inner peripheral surface of said frame having gripping members distributed along said inner peripheral surface of said frame;
    (b) a handle shaft extending radially outward from said outer peripheral surface of said frame, said handle shaft having a proximal end attached to said frame and a distal end extending away from said handle shaft, said handle shaft having a slit extending from the inner peripheral surface through the frame and radially within the handle shaft, terminating prior to the distal end, said slit configured to accommodate the test stem of a leak test gasket;
    (c) an open trapezoidal shaped ring shaped handle grip attached to said distal end of said shaft, said handle grip configured to be gripped by a manipulation arm of an underwater remotely operated vehicle; and
    (d) a tab extending radially outward from said outer peripheral surface of said frame, said tab positioned on said ring-shaped frame opposite from said handle, the width of said tab being so dimensioned as to be insertable between the edges of adjacent bolt holes on a pipe connection flange.

17. The gasket insertion apparatus as recited in claim 16, wherein the width of said handle is so dimensioned as to be insertable between the edges of adjacent bolt holes of a pipe connection flange.

18. The gasket insertion apparatus as recited in claim 17, wherein said handle shaft has a scored area creating a desired break-off point on said handle.

19. The gasket insertion apparatus as recited in claim 18, wherein said frame, said handle, and said tab are aluminum.

20. The apparatus as recited in claim 16, wherein the gripping members are angularly cut teeth.

21. The gasket insertion apparatus as recited in claim 16, wherein the frame has at least one scored area creating at least one break-off point on the frame.

22. A gasket insertion apparatus for inserting fluid sealing gasket between bolted flange connectors of adjacent pipe sections, comprising:
    (a) a flat frame, said flat frame having an inner peripheral surface and an outer peripheral surface, said inner peripheral surface of said frame having a plurality of angularly cut teeth distributed along said inner peripheral surface of said frame;
    (b) a handle shaft extending radially outward from said outer peripheral surface of said frame, said handle shaft having a proximal end attached to said frame and a distal end extending away from said handle shaft;
    (c) an open geometric ring-shaped handle grip attached to said distal end of said shaft, said handle grip configured to be gripped by a manipulation arm of an underwater remotely operated vehicle; and
    (d) a circular fluid sealing gasket, said gasket being mounted within said inner peripheral surface of said frame and held in place by said plurality of angularly cut teeth;
    wherein the handle shaft has a slit extending from the inner peripheral surface through the frame and radially within the handle shaft, terminating prior to the distal end.

23. The gasket insertion apparatus as recited in claim 22, wherein in said frame is a flat, circular ring-shaped frame.

24. The gasket insertion apparatus as recited in claim 23, further comprising a tab extending radially outward from said outer peripheral surface of said frame, said tab positioned on said ring-shaped frame opposite from said handle, the width of said tab so dimensioned as to be insertable between the edges of adjacent bolt holes on a pipe connection flange.

25. The gasket insertion apparatus as recited in claim 24, wherein the slit is configured to accommodate a test stem of a leak test gasket.

26. The gasket insertion apparatus as recited in claim 22, wherein said frame is a flat, U-shaped frame.

27. The gasket insertion apparatus as recited in claim 26, wherein the said slit is configured to accommodate a test stem of a leak test gasket.

28. A method of inserting a fluid sealing gasket between the bolted connection flanges of adjacent underwater pipe line segments comprising the steps of:
  (a) providing a gasket insertion apparatus having:
    i) a flat frame, said flat frame having an inner peripheral surface and an outer peripheral surface, said inner peripheral surface of said frame having a plurality of angularly cut teeth distributed along said inner peripheral surface of said frame;
    ii) a handle shaft extending radially outward from said outer peripheral surface of said frame, said handle shaft having a proximal end attached to said frame and a distal end extending away from said handle shaft and a slit extending from the inner peripheral surface through the frame and radially within the handle shaft, terminating prior to the distal end; and
    (iii) an open geometric ring-shaped handle grip attached to said distal end of said shaft, said handle grip configured to be gripped by a manipulation arm of an underwater remotely operated vehicle;
  (b) providing a fluid sealing gasket;
  (c) mounting said gasket onto said inner peripheral surface of said frame of said gasket insertion apparatus whereby said gasket is held in place on said frame by said plurality of angularly cut teeth;
  (d) providing a plurality of alignment pins and connection bolts;
  (e) bringing said gasket insertion apparatus with said mounted gasket and said alignment pins to a desired underwater location for making a bolted connection of adjoining flanges of pipe line segments, each of said flanges having a plurality of bolt holes;
  (f) aligning said adjoining flanges by inserting at least two alignment pins through selected bolt holes of each of said adjoining flanges;
  (g) grasping said handle grip of said gasket insertion apparatus;
  (h) inserting said gasket insertion apparatus with said mounted gasket between said adjoining flanges; and
  (i) bolting said adjoining flanges together with said bolts leaving said gasket in position between said flanges.

29. The method of inserting a fluid sealing gasket between the bolted connection flanges of adjacent underwater pipe line segments as recited in claim 28, wherein:
  (a) said frame of said gasket insertion apparatus is a flat, ring-shaped frame; and
  (b) said frame has a tab extending radially outward from said outer peripheral surface of said frame, said tab positioned on said ring-shaped frame opposite from said handle, the width of said tab being so dimensioned as to be insertable between the edges of adjacent bolt holes of said pipe connection flanges.

30. The method of inserting a fluid sealing gasket between the bolted connection flanges of adjacent underwater pipe line segments as recited in claim 29, wherein the step of grasping said handle grip of said gasket insertion apparatus includes grasping said handle grip by a manipulation arm of an underwater remotely operated vehicle.

31. The method of inserting a fluid sealing gasket between the bolted connection flanges of adjacent underwater pipe line segments as recited in claim 29, wherein the step of inserting said alignment apparatus with said mounted gasket between said adjacent connection flanges includes positioning said tab between said alignment pins whereby said tab and said alignment pins will guide the alignment and placement of said gasket between said connection flanges.

32. The method of inserting a fluid sealing gasket between the bolted connection flanges of adjacent underwater pipe line segments as recited in claim 28, wherein:
  (a) said fluid sealing gasket is a leak test gasket having a radially extending test stem;
  (b) said slit is configured to accommodate the test stem of a leak test gasket; and
  (c) said test stem of said gasket is inserted into said slit in said handle when said gasket is mounted onto said gasket insertion apparatus.

33. The method of inserting a fluid sealing gasket between the bolted connection flanges of adjacent underwater pipe line segments as recited in claim 32, wherein the step of inserting said alignment apparatus with said mounted gasket between said adjacent connection flanges includes positioning said tab between said alignment pins whereby said tab and said alignment pins will guide the alignment and placement of said gasket between said connection flanges.

* * * * *